No. 870,809. PATENTED NOV. 12, 1907.
C. L. WALKER.
SURVEYING INSTRUMENT.
APPLICATION FILED MAR. 30, 1907.
2 SHEETS—SHEET 2.
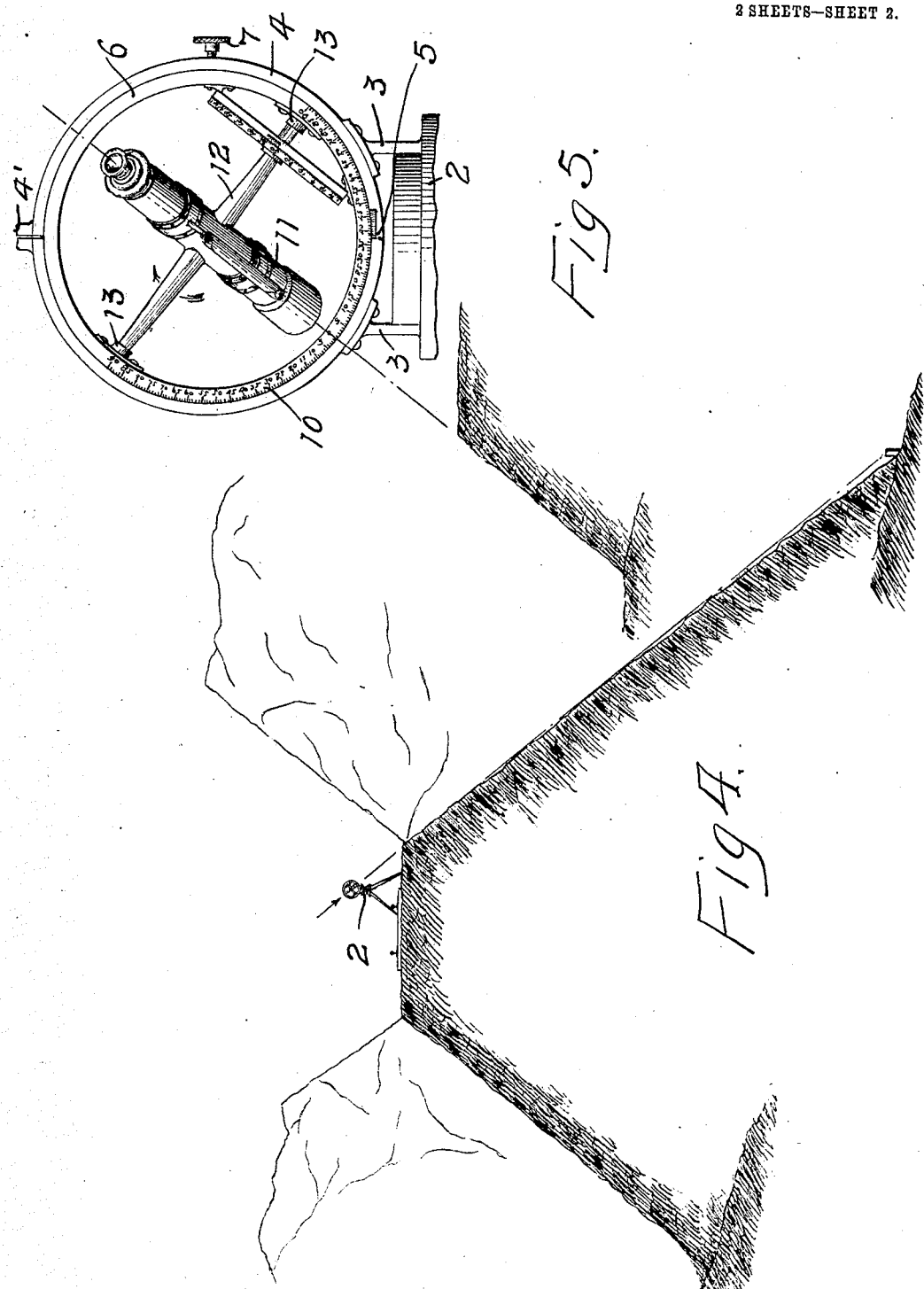

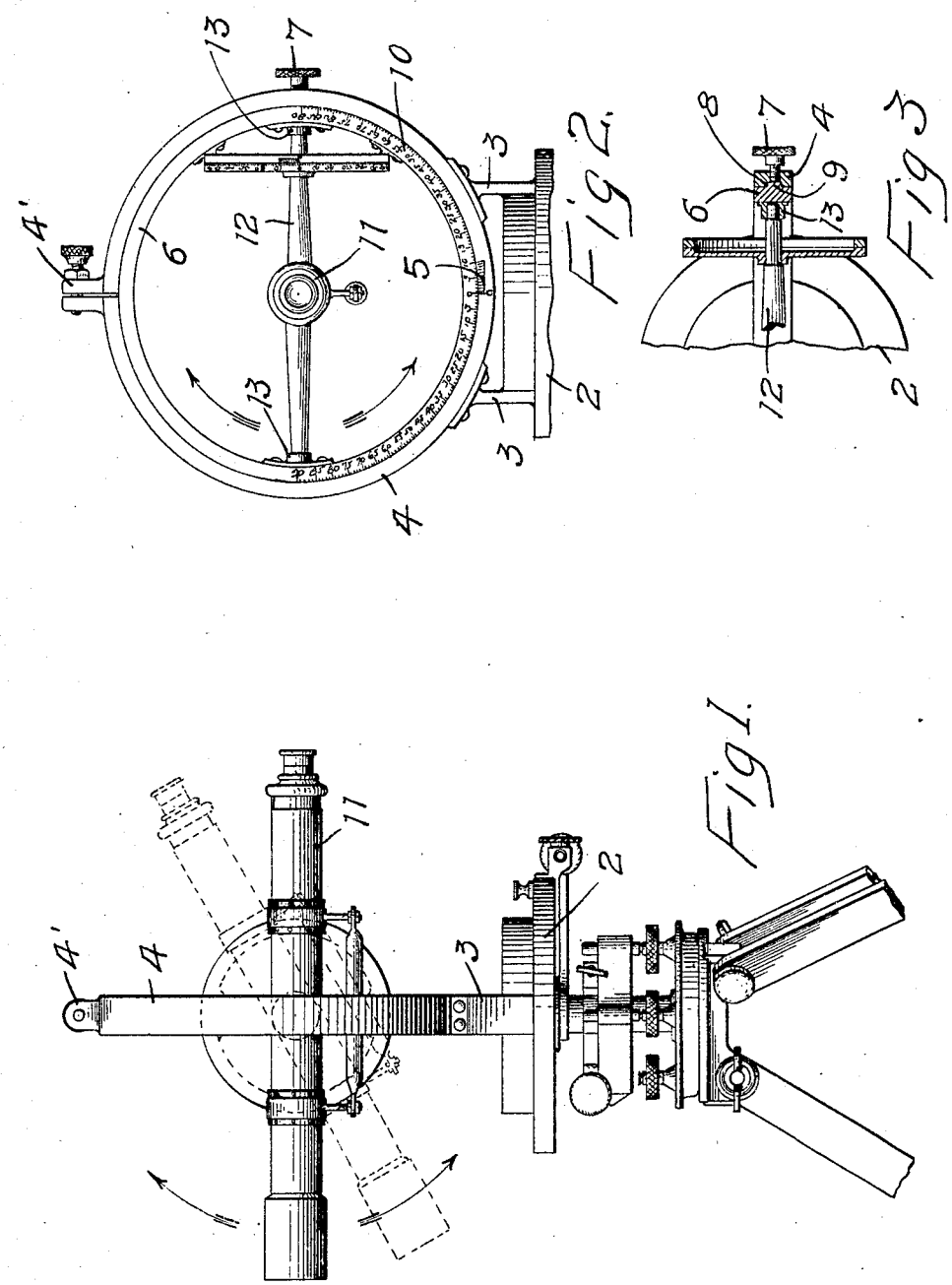

UNITED STATES PATENT OFFICE.

CLINTON LEE WALKER, OF PIEDMONT, CALIFORNIA.

SURVEYING INSTRUMENT.

No. 870,809.  Specification of Letters Patent.  Patented Nov. 12, 1907.

Application filed March 30, 1907. Serial No. 365,534.

*To all whom it may concern:*

Be it known that I, CLINTON L. WALKER, of Piedmont, Alameda county, California, have invented certain new and useful Improvements in Surveying Instruments, of which the following is a specification.

My invention relates to surveying instruments, and the object of the invention is to provide an improvement capable of attachment to a level, a transit or a compass, and a further and particular object of my present invention is to demonstrate the application of the improvement to a transit.

The invention consists generally in providing means whereby a transit will not only measure angles in a vertical or horizontal plane but also in a plane inclined to the horizontal.

Further, the invention consists in various constructions and combinations, all as hereinafter described and particularly pointed out in the claims.

In the accompanying drawings, forming part of this specification, Figure 1 is a side elevation of the portion of a transit embodying my invention. Fig. 2 is a front view of the same. Fig. 3 is a detail view illustrating the construction of my improvement. Figs. 4 and 5 are perspective views illustrating the manner of using the instrument to determine the position of slope stakes in railroad grading.

In railroad work slope stakes are used to mark the intersection of an inclined plane of the fill with the irregular surface of the earth. A level is generally used to determine the position of these stakes and as it is necessary to constantly move the instrument, the work has been found to be slow and very laborious. An ordinary transit may be used for measuring angles in a vertical or horizontal plane but as constructed is impracticable for use when the plane is inclined to the horizontal. For the purpose of economizing time and labor in setting slope stakes and in similar work I have improved the ordinary transit in the following manner:

Referring to Fig. 1, 2 represents a transit having standards 3 supporting a ring 4 of special construction. This ring is stationary and has a scale with a zero mark indicated at 5. Within and concentric with the ring 4 is a second ring 6 that is capable of rotation within the first named ring and may be secured at any desired point therein by the thumb screw 7. The outer ring is divided and provided with a clamp 4' by means of which it may be contracted or expanded to regulate the degree of friction between it and the inner ring. This splitting or dividing of the ring permits its expansion sufficiently to allow the insertion of the inner ring in assembling the parts of the transit. The outer ring 4 preferably has an annular groove 8 to receive a rib 9 on the periphery of the inner ring, the interlocking of the groove and rib serving to hold the rings in proper alinement with one another. The ring 6 has a scale 10 graduated in degrees and minutes from zero to 360°, or from zero to 180° each way right and left from the zero point.

In Fig. 2 I have indicated the scale extending each way from zero to 90°, but it will be understood that in practice I propose to continue the scale around the remainder of the circle. The scale as shown, however, will be sufficient to illustrate my invention. 11 is the telescope usually provided on instruments of this kind having a long bubble tube supported by straps beneath the telescope so that the level will always hang directly under the telescope regardless of its inclination. The telescope has an axis 12 pivotally supported in bearings 13 and the ring 6. When this axis is horizontal the zero marks of the rings 4 and 6 will coincide with or be opposite one another as indicated in Fig. 2. The instrument will then read angles in a vertical plane in the ordinary way. If the operator desires to incline the axis 12 to permit the telescope to be revolved in a plane at an angle to the vertical, say for instance 10°, he will loosen the clamping screw 7 and turn the inner ring 6 until its 10° mark is opposite the zero mark of the outer ring. The telescope will now read angles in a plane inclined at 80° from the horizontal. If it is desired to set slope stakes on a railway survey, assuming that the fill will be one to one or 45°, the operator will set the ring 6 so that the 45° mark of said ring will be opposite the zero mark of 4. The axis of the telescope will then be inclined 45° and the telescope will read angles in a plane inclined 45° to the horizontal. The slope stake will then be located in the usual way and the instrument ranged in, so that a sight parallel to the center line of the survey will intersect the slope stake. Additional stakes may now be set by placing them where the normally vertical and now inclined hair of the telescope intersects the surface of the earth without the necessity of moving the instrument each time a stake is placed. Assuming that the slope stake for the one to one or 45° slope is 18 feet from the center of the roadway then when a stake, as the fill is continued, is 9 feet from the center, it will mean that the stake is at grade and there will be no cut or fill. When the distance is less than 9 feet the grade will have passed from a cut to a fill and the instrument must be set again.

In mine surveying the instrument can be used, and in prospecting, an inclined vein can be traced over a mountainous country as the vein will merely represent the intersection of an inclined plane with the irregular surface of the earth.

I claim as my invention:

1. The combination, with a transit having a fixed ring, of a second ring rotatably mounted within said first named ring and concentric therewith and bearing a suitable scale graduated in degrees and minutes and readable from zero to the right and to the left, the graduations of said inner ring being adapted to be set opposite a fixed mark on the outer ring according to the inclination desired, and a telescope having bearings in said rotatable ring and whereby angles can be read in a plane inclined to the horizontal, substantially as described.

2. The combination, with a transit, of a fixed outer ring having a zero mark thereon, an inner ring rotatably mounted and concentric with said outer ring, means for clamping said inner ring, said inner ring having a scale graduated in degrees and minutes and readable from zero to the right and to the left around said ring, the graduations of said inner ring being adapted to be set opposite the zero mark of said outer ring when the inner ring is rotated, and a telescope having an axis journaled in said inner ring and adapted to be swung by the rotation of said inner ring to a plane inclined to the horizontal, substantially as described.

In witness whereof, I have hereunto set my hand this 27th day of March 1907.

CLINTON LEE WALKER.

Witnesses:
RICHARD PAUL,
J. B. ERA.